D. EDWARDS.
Revolver.

No. 1,134. Patented April 25, 1839.

UNITED STATES PATENT OFFICE.

DAVID EDWARDS, OF ZANESVILLE, OHIO.

IMPROVEMENT IN FIRE-ARMS.

Specification forming part of Letters Patent No. 1,134, dated April 25, 1839.

*To all whom it may concern:*

Be it known that I, DAVID EDWARDS, of Morgan county, in the State of Ohio, have invented a new and useful Improvement in Fire-Arms; and I do hereby declare that the following is a full and exact description thereof, reference being had to the annexed drawings of the same, making part of this specification.

The nature of my invention consists in attaching to and at the hind end of a barrel of the common form a cylinder containing several calibers or chambers, so constructed as to revolve and bring each chamber in succession in a line with the barrel in the act of cocking, and also to prime by the same act.

To enable others skilled in the art to make and use my invention, I will proceed to describe its construction and operation in the application of it to a rifle, gun, or horseman's pistol.

Figure 1:
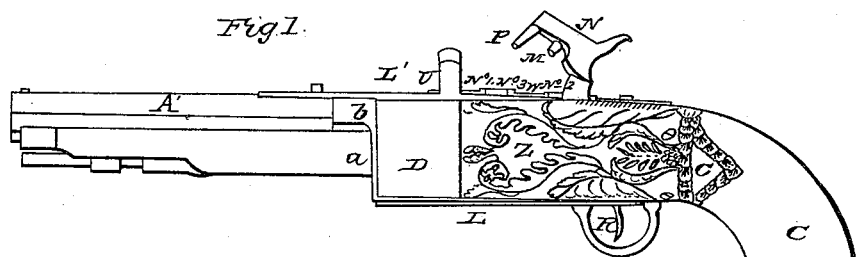
Figure 2:
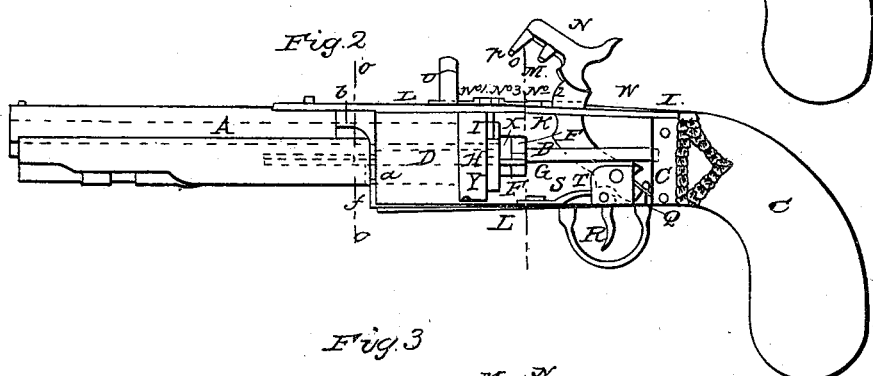
Figure 3:
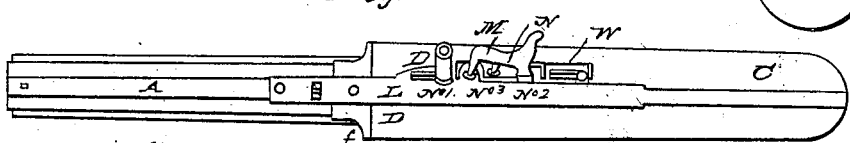
Figure 4:
Figure 5:
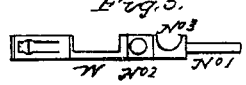
Figure 6:
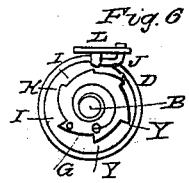
Figure 7:
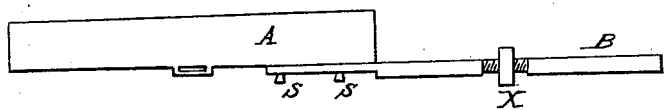
Figure 8:
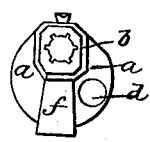

Figure 1 represents a side view of the piece. Fig. 2 represents a view of the inside of the piece between the cylinder and stock; Fig. 3, a top view of the piece. Fig. 4 represents the end of the cylinder turning against the rear end of the barrel and exhibiting the several chambers in the cylinder. Fig. 5 is a top view of the priming-slide attached to the cock and moving with it. Fig. 6 represents a cross-section at the red line $o'$ in Fig. 2, showing an end view of the cylinder, rag-wheel fastened to it, volute spring attached to the rag-wheel and spindle, and a side view of the dog. Fig. 7 represents the barrel, spindle, and nut detached from the stock; Fig. 8, section through the blue line $o''$.

First I use a cylinder, D, Figs. 1, 2, 3, 4, and 6, of brass or other metal, from two to three inches long and about the same in diameter, or of any suitable dimensions, through the center of which is made a hole, V, Fig. 4, and around which center hole, at equal distances apart, are bored the calibers E, which are to receive the charges. This cylinder is attached to the hinder end of a barrel, A, Figs. 1, 2, 3, and 7, of the common form, by a spindle, B, Figs. 2, 6, and 7, which is fastened to the hind end and under side of said barrel by means of screws $s\ s$, Fig. 7, passing through a flattened end thereof into the under side of the barrel, and made to pass through the center of said cylinder, and then passes back into and is attached to the fore end of the stock C. On the said spindle, close behind the cylinder, is cut a thread or screw, on which a nut, X, Figs. 2 and 7, is screwed, which serves to hold the cylinder firmly to the fore barrel, which is thus made to fit in a close joint thereto. Also, behind the cylinder and forward of said nut is a notched wheel, H, Figs. 2 and 6, called the "rag-wheel," firmly attached to the cylinder and turning with it, in which rag-wheel there is a number of teeth, Y, Figs. 2 and 6, corresponding with the number of bores in the cylinder. Next behind the said nut, on the spindle, is placed a volute spring, F, Figs. 2 and 6, one end of which is fastened to the said spindle, and the other end is attached by a screw, G, inserted into the rag-wheel or otherwise to the hind end of the cylinder, which spring, in the act of loading the chambers, is wound up or contracted, and when firing them it is extended, which will be more particularly described in the operation.

There is also a dog, I, made to act in the notches of the rag-wheel or against the teeth, and is holden thereto by a spring, K, the other end of the dog being moved by a picker or point, M, on the cock N, which picker or point strikes down upon one end of the dog in the act of discharge and lifts the other end of said dog out of the notch in the rag-wheel H, and is prepared thereby to let the cylinder turn until the dog comes in contact with the tooth of the next notch in the rag-wheel, the cylinder D being revolved in the act of cocking by the elastic force of the volute spring, as will be seen hereinafter in describing the operation of the piece. There are also two straps, L L', of iron, steel, or other metal, one placed on the upper and the other on the under side of the cylinder, the fore ends of which are firmly attached to the hind end of the barrel A, and the rear ends are fastened to the front end of the stock C, said straps running back, the one over and the other under the cylinder, being so arranged as not to touch or impede the motion of the cylinder, the hind ends of which straps being bent to correspond with the shape of the stock C, to which they are firmly screwed. The under strap, L, is turned up vertically under the rear end of the barrel, then horizontally, and screwed to the under side of the barrel by the screws s s, that secure the spindle to it. By this means the stock and barrel are united strongly together.

On the upper strap, L′, before the cock, is placed a magazine, U-shaped, similar to a cup or thimble, to contain the percussion-powders, through which at the base is a passage or oblong hole, in which a slide, W, Figs. 1, 2, and 5, attached or bridled to the cock, is made to slide or work horizontally backward and forward. Said slide, at its fore end, has a small hole, No. 1, through it, which, when drawn from the magazine in the act of cocking, draws from it a grain of percussion-powder, and when drawn still farther back, until it comes over the touch-hole, it drops from the slide into the touch-hole. Said slide is perforated with another aperture, No. 2, for the picker or point of the cock to strike through upon the dog, and another, No. 3, for the end of the cock to strike through in discharging. The lower end of the cock N, the trigger R, the main-spring Q, and trigger-spring S are all fixed to the under strap, L, behind the cylinder, and, being constructed and arranged similar to others in use, need not therefore be more particularly described.

There is a boxing, Z, Fig. 1, formed around the before-described parts of the lock by affixing brass or other metal in a circular form at or near the hind end of the cylinder, to fasten and fit to the two straps and extend back to the stock and fasten thereto, so as to cover the touch-holes of the cylinder and all the hind works of the cock.

In front of the muzzles of the chambers are fastened to the barrel two metallic plates, a a, Fig. 8, each the segment of a circle equal to about one-third the size of the circle of the cylinder, having a flange, b, projecting outward from the upper end, corresponding in shape to the part of the barrel to which it is screwed. One of these segment-plates is perforated with a round aperture, d, through which the charges are inserted into the chambers of the cylinder. The space between said segment-plates is occupied by the rear end of the barrel and the turned-up end of the under strap, L, as at f.

In the use of a rifle, when and after all the work is done except finishing the chambers or calibers in the cylinders, screw the nut up behind the cylinder, so as to hold the cylinder immovably to and in a straight line with the barrel, and the rag-wheel dog in its notch. Then the cylinder is bored through the fore barrel and rifled with the rifles of the fore barrel, each and every one with the dog in its notch, so that when the cylinder thus finished revolves ever after the calibers in succession will exactly coincide with the caliber of the fore barrel, and the rifles in the cylinder will exactly meet the rifles or furrows in the barrel, and will thereby cause the firing to be more true, inasmuch as the patch will not be stripped from the ball in passing from the smooth chambers to the rifled barrel, as heretofore has been the case.

Now, in order to render the construction and use of this fire-arm clear to any person, the operation will here be described more fully.

In charging the several chambers the cylinder must be turned in a contrary direction to its movement while firing, which will bring the chambers, each in succession, opposite the aperture in the plate against which the cylinder turns, and through which aperture the charges are passed into the chambers. The first chamber, being brought opposite said aperture, is held in that position by the dog and rag-wheel until the charge is inserted, the volute spring, which was extended at the commencement of the charging operation, having thus been partly contracted at the last mentioned operation. The cylinder is again turned in the same direction until the next chamber comes in the same place, which in like manner still further contracts the volute spring, and the cylinder is held in a fixed position, as before, until this chamber is charged. The cylinder is again turned in the same manner for a third charge, and so on until all the chambers are loaded and the spring is contracted, which will be effected at the end of the charging operation.

The magazine being supplied with percussion-primers, the piece will be ready for discharging, which will be performed in the following manner:

A charged chamber being in a line with the barrel and the cock drawn back and cocked, which movement draws a primer from the magazine by means of the slide and deposits it in the touch-hole in the side of the cylinder, the trigger is then pulled. The mainspring drives the point p and picker M of the cock down upon the percussion-primer and dog simultaneously, the point p entering the touch-hole of the cylinder, producing the explosion and holding the cylinder firmly while the picker M depresses one end of the dog, upon which it strikes and raises the other end from the notch, ready to allow the cylinder to turn until the next loaded chamber comes in a line with the barrel and the tooth of the notch opposite said chamber comes in contact with the end of the dog, by which the movement of the cylinder is arrested, and the cylinder is held firmly in that position. The movement of the cylinder commencing as soon as the point of the cock begins to rise from the touch-hole in the act of cocking, effected by the elastic force of the volute spring, the dog, pressed by its spring K, strikes on the top of the notch out of which it last came by the time the point of the cock leaves the touch-hole, when it slides to the next notch. In this manner all the chambers are discharged.

The invention claimed and desired to be secured by Letters Patent consists—

1. In the application of the volute spring for turning the cylinder, as before described, by which the cylinder becomes self-revolving in the act of cocking.

2. The rag-wheel and dog, as combined with the volute spring, for holding each chamber of the cylinder in a line with the barrel at every discharge, as before described; also, the mode of raising the dog from the rag-wheel at each discharge by the picker on the cock, as herein described.

3. The arrangement and application, as before described, of the nut on the spindle for forcing the cylinder against the barrel, so as always to preserve a tight joint at the union of the two.

4. The rifling of shifting chambers as applied to a fore barrel, smooth or rifled, in combination therewith, as before described, whether of a revolving, sliding, hinged, or other kind of shifting chambers.

DAVID EDWARDS.

Witnesses:
JAMES MOORE,
C. F. ALDEN.